United States Patent [19]

Leigh-Monstevens

[11] Patent Number: 4,785,615

[45] Date of Patent: Nov. 22, 1988

[54] HYDRAULIC SHIFT FOR MOTOR VEHICLE AUTOMATIC TRANSMISSION

[76] Inventor: Keith V. Leigh-Monstevens, 5622 Larkins, Troy, Mich. 48098

[21] Appl. No.: 555,666

[22] Filed: Nov. 28, 1983

[51] Int. Cl.⁴ ............................................. B60T 17/22
[52] U.S. Cl. ...................................... 60/534; 60/545; 60/571; 60/636; 200/61.88; 340/79
[58] Field of Search ................ 60/571, 570, 636, 583, 60/534, 545; 340/52 R, 79, 134; 200/61.88

[56] References Cited

U.S. PATENT DOCUMENTS

| | | | |
|---|---|---|---|
| Re. 28,017 | 5/1974 | Dence | 74/477 |
| 2,992,632 | 7/1961 | Nichols | 60/534 |
| 3,171,694 | 3/1965 | Sisson | 60/545 |
| 3,199,288 | 8/1965 | Nahas | 60/636 |
| 3,583,159 | 6/1971 | Saint-Etienne et al. | 91/460 |
| 3,626,696 | 12/1971 | Munier | 60/545 |
| 3,854,559 | 12/1974 | Talak et al. | 192/4 A |
| 3,944,013 | 3/1976 | LaPointe | 60/549 |
| 4,006,669 | 2/1977 | Price | 92/13.1 |
| 4,030,560 | 6/1977 | Parquet | 60/571 |
| 4,068,537 | 1/1978 | Wolfe | 91/22 |
| 4,155,068 | 5/1979 | Zajichek | 340/79 |
| 4,199,747 | 4/1980 | Miller | 340/79 |
| 4,372,118 | 2/1983 | Andresen | 60/583 |
| 4,454,632 | 6/1984 | Nix | 92/23 |
| 4,519,266 | 5/1985 | Reinecke | 200/61.88 |

Primary Examiner—Abraham Hershkovitz
Attorney, Agent, or Firm—Krass & Young

[57] ABSTRACT

A hydraulic apparatus for remotely controlling the operative mode selector of a motor vehicle automatic transmission. The apparatus comprises a master cylinder having an input member operatively connected to the transmission operative mode selection or shift lever placed at the disposal of the motor vehicle operator, and a slave cylinder mounted on or proximate the transmission casing and having an output member connected to the transmission operative mode selector, the master cylinder and the slave cylinder being placed in fluid communication through flexible conduits such that each displacement of the master cylinder piston as a result of displacement of the master cylinder input member causes a corresponding displacement of the slave cylinder piston coupled to the slave cylinder output member. After assembly of the components, the apparatus is filled with hydraulic fluid and, preferably, break-away restraining straps are installed to hold the master cylinder input member and the slave cylinder output member against extension beyond a limit.

2 Claims, 2 Drawing Sheets

HYDRAULIC SHIFT FOR MOTOR VEHICLE AUTOMATIC TRANSMISSION

BACKGROUND OF THE INVENTION

The present invention relates to a hydraulic apparatus for remotely shifting a motor vehicle automatic transmission.

Motor vehicle automatic transmissions are provided with a manual control for selecting the mode of operation of the transmission, for example for shifting from park and/or neutral to reverse or to forward drive, or to prevent automatic shifting from a high gear ratio to a lower gear ratio or to straight-through drive, or to overdrive. The manual control or selector takes the form of a steering column mounted pivotable lever, or of a floor mounted lever or quandrant.

The shift control lever or selector conventionally operates, through cables or rods and links, a mode selection arm pivotally mounted on the transmission casing, the mode selection arm being mounted on the end of a control input shaft projecting within the transmission casing and adapted to operate diverse control members within the transmission casing, such as hydraulic valves or solenoids, for functionally establishing an operative mode of the transmission, under the control of the shift control or selector lever. The selected operative mode corresponds to an appropriate position of the shift control or selector lever, and an indication of the selected operative mode is provided to the motor vehicle operator in the form of a visual display, for example in the form of a sector with appropriate markings, each corresponding to a selected operative mode. The visual display or indicator is conventionally placed on one or both edges of a housing mounted on the floor and through which projects the floor mounted shift control or selector lever or, in installations providing a steering column mounted selector lever, the selected mode of operation of the transmission is indicated through the displacement of a cursor in the front of the indicator panel or sector.

Mechanical linkages between the shift control or selector lever and the control input arm of the transmission are rather complex, more particularly in installations wherein it is desired to control the automatic transmission associated with a front wheel drive motor vehicle in which the transmission and differential are enclosed in a common casing, the whole mechanism forming a so-called transaxle which is generally mounted on the motor vehicle frame in front of the engine or parallel to a transversely mounted engine, in view of the many bends required around diverse components installed in a very crowded engine compartment, or in rear-engine vehicles such as buses and coaches.

SUMMARY OF THE INVENTION

The principal object of the present invention is to provide a flexible hydraulic linkage for motor vehicle automatic transmissions between the motor vehicle transmission shift lever, or mode selector lever, operable by the motor vehicle driver, and the transmission mode input control at the transmission casing or housing. The present invention provides hydraulic coupling between the shift control or mode selection lever and the transmission, the operating member controlling the transmission mode input at the transmission casing end taking the form of a slave cylinder connected by flexible conduits, which can be wrapped around any obstructions in the engine compartment, to a master cylinder whose input member is operated by the shift control or mode selection lever, the hydraulic apparatus being a constant volume hydraulic apparatus providing precise positioning of the slave cylinder output member which is the analog of the linear position of the master cylinder input member as displaced by the driver operated shift control of mode selection lever. The present invention further provides a remote light indicator or annunciator of the selected operative mode of the transmission, which can be mounted at any appropriate position on a motor vehicle instrument panel. The hydraulic apparatus of the invention is prefilled and pretested, after full assembly. Preferably, the input member of the master cylinder is held by a restraining strap, during shipment and installation of the apparatus on a motor vehicle, to a position facilitating installation in the motor vehicle and connecting to the shift or mode selection lever, and the output member of the slave cylinder is also maintained in an appropriate position by a restraining strap. The restraining straps are so constructed that they do not interfere with normal operation of the apparatus after installation on a motor vehicle.

The many objects and advantages of the present invention will become apparent to those skilled in the art when the following description of an example of the best mode contemplated at the present for practicing the invention is read in conjunction with the accompanying drawing wherein like reference numerals refer to like or equivalent parts, and in which:

DETAILED DESCRIPTION OF THE PREFERRED EMBODIMENTS

Figure 1:
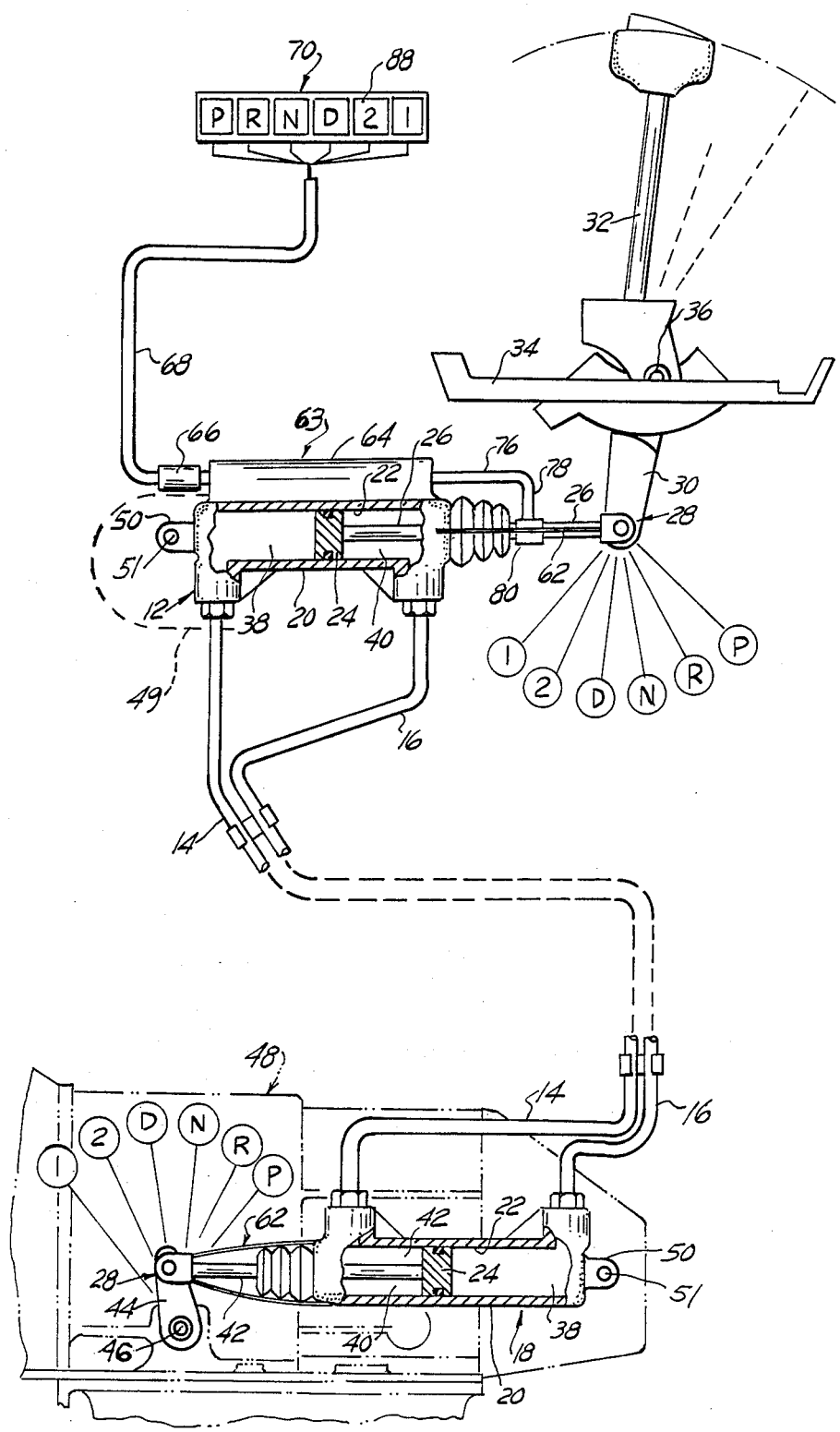
FIG. 1 is a schematic illustration of an automatic transmission hydraulic remote mode selector according to the present invention illustrated in a structure for operation by a floor shift lever or mode selection lever.

Referring now to the drawing and more particularly to FIG. 1 thereof, there is illustrated a hydraulic apparatus according to the present invention comprising a master cylinder 12 hydraulically connected via a pair of flexible conduits 14 and 16 to a slave cylinder 18. The master cylinder 12 takes the form of a cylindrical housing 20 having a longitudinal bore 22 in which is disposed a reciprocable piston 24. The piston 24 is mounted on the end of a push-rod 26 passing through a seal-provided bore in an end cap, not shown, closing one end of the bore 22 in a well-known manner. The other end of the push-rod 26 is pivotally connected through a clevis and pin arrangement 28 to the end of an arm 30 mounted on the end of a shift lever, or mode selection lever, 32 pivotally mounted through the floor 34 of the driver's compartment of a motor vehicle, in the usual manner, the mode selection lever 32 being pivotable about a fulcrum arrangement 36. Angular positioning of the mode selection lever 32 about its fulcrum pivot arrangement or structure 36 causes substantially linear displacement of the push rod 26 and consequently of the piston 24 within the master cylinder bore 22 such that hydraulic fluid contained in a chamber 38 on one side of the piston 24 is displaced through the conduit 14, and hydraulic fluid in a chamber 40, formed on the other side of the piston 24, is displaced through the conduit 16 connected to the chamber 40.

The slave cylinder 18 is structurally identical to the master cylinder 12 as a result of also being in the form of a tubular housing 20 having a bore 22 in which is disposed, reciprocably, a piston 24 dividing the bore 22 into two chambers 38 and 40 disposed on one side and on the other side of the piston 24. The piston 24 is mounted on the end of an output rod 42. The chamber 38 of the master cylinder 12 is connected through the flexible conduit 14 to the chamber 40 of the slave cylinder 18, and the chamber 40 of the master cylinder 12 is connected to the chamber 38 of the slave cylinder 18, with the result that any motion, relative to the master cylinder 12, of the master cylinder input rod 28 causes a correspondingly proportional displacement of the slave cylinder output rod 42, relative to the housing 20 of the slave cylinder 18. The end of the slave cylinder output rod 42 is pivotally connected by a clevis and pin arrangement 28 to the end of a transmission mode selection arm 44 clamped or otherwise mounted on the transmission function or mode input member taking the form of an angularly positionable shaft 46 projecting from the housing of the transmission 48. The slave cylinder 18 is mounted by means of an appropriate lug 50 at an appropriate location on the housing or casing of the transmission 48, while the master cylinder is also mounted by means of a similar lug 50 in an appropriate position on a support member 49 on the motor vehicle frame, not shown, each by means of a bolt, not shown, for example passed through an aperture 51 in the lug 50, such that each cylinder housing 20 is pivotally attached to a support member to permit the housing to self-orient to compensate for the rigid connection between its piston 24 and, respectively, the push-rod 26 or 42.

Figure 2:
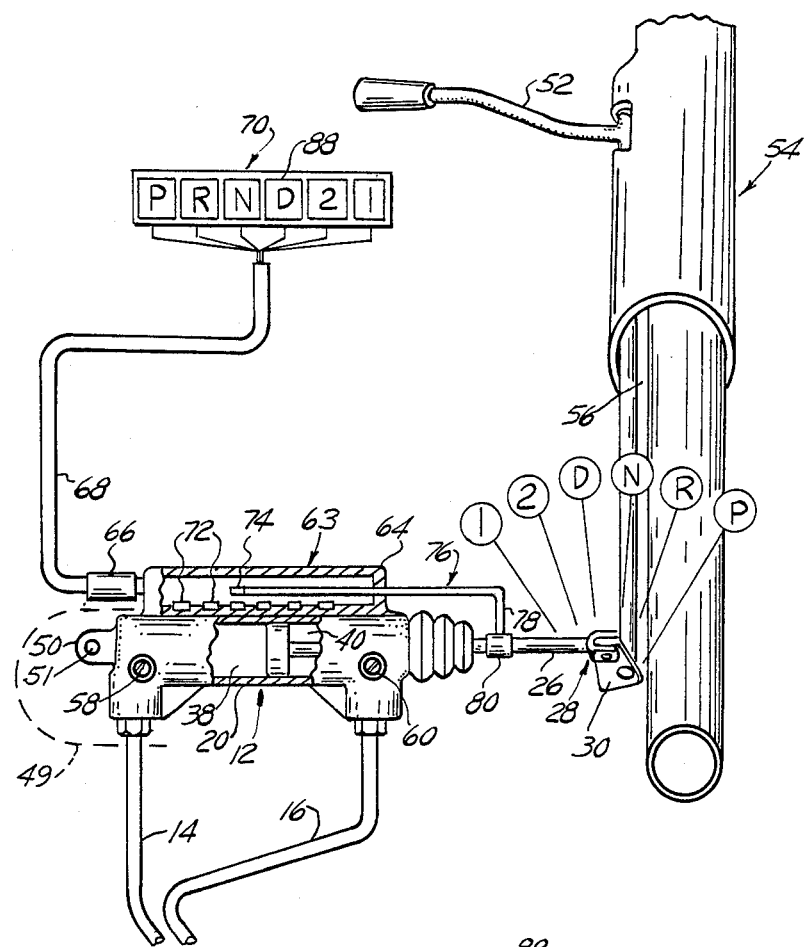
FIG. 2 is a partial view similar to FIG. 1 but showing a modification for operation by a steering column mounted shift lever or mode selection lever, with portions broken away to illustrate internal construction not shown at FIG. 1.

It is readily apparent that the structure of the invention is the same whether the master cylinder input rod 26 is operated by a floor mounted shift or made selection lever 32, FIG. 1, or whether it is operated by a shift or mode selection lever 52, FIG. 2, mounted on the steering column 54 of a motor vehicle, the shift or mode selection lever 52 rotatably operating a rod 56 provided on its end with an arm 40 coupled through a clevis pin arrangement 38 to the end of the master cylinder input rod or pushrod 26.

It will be readily apparent that, because the chambers 38 have a slightly larger volume than the chambers 40, in view of the presence of the push-rods 26 and 42, respectively, in the chamber 40 of the master cylinder 12 and in the chamber 40 of the slave cylinder 18, respectively, the arrangement of FIG. 1 provides a slightly greater displacement of the slave cylinder pushrod 42 for each unit of displacement of the master cylinder input member or push-rod 26. If equal displacements are desirable, the conduits 14 and 16 may be crossed such that the chamber 38 of the master cylinder 12 is connected to the chamber 38 of the slave cylinder 18, and the chamber 40 of the master cylinder 12 is connected to the chamber 40 of the slave cylinder 18, and the respective positions of the cylinders are appropriately modified.

The hydraulic apparatus 10 is prefilled with hydraulic fluid after assembly of the components and connection of the master cylinder 12 to the slave cylinder 18 by way of the flexible conduits 14 and 16. Preferably, the method for prefilling the hydraulic apparatus is the method disclosed in detail in copending application Ser. No. 400,276, filed July 21, 1982, assigned to the same assignee as the present application. For the purpose of prefilling with hydraulic fluid the apparatus of the invention, bleed screws 58 and 60 of the master cylinder 12, FIG. 2, are loosened such as to place appropriate ports normally obturated by the bleed screws 58 and 60, and leading respectively in the chambers 38 and 40 of the master cylinder, in communication with a source of vacuum, by way of an appropriate manifold, for extracting all atmospheric air from the apparatus. Subsequently, the bleed ports are connected to a source of fluid under pressure for filling of the whole apparatus with hydraulic fluid, and the bleed screws are tightened. Alternatively, the hydraulic apparatus may be filled with hydraulic fluid by providing the slave cylinder 18 with similar bleed screws which are open while fluid is introduced past the bleed screws 58 and 60 through the bleed ports of the master cylinder 12 until all the air is purged from the apparatus, at which time all the bleed screws are tightened such that the apparatus of the invention is permanently closed and prefilled.

Preferably, the output member or push-rod 42 of the slave cylinder 18 is held, during prefilling of the apparatus with hydraulic fluid, by a restraining straps 62, while the input member or pushrod 26 of the master cylinder 12 is held by a similar restraining strap 62. The restraining straps 62 are similar in structure to those disclosed in prior copending application Ser. No. 344,496, now U.S. Pat. No. 4,454,632 assigned to the same assignee as the present application. The restraining straps 62 maintain the respective push-rods 26 and 42 against extension in a position facilitating installation of both the master cylinder 12 and slave cylinder 18 by positioning the end of the push-rods 26 and 42 respectively in appropriate positions. Upon first actuation of the master cylinder input member or push-rod 26 toward an extended position, the associated restraining strap 62, provided with a break-away portion, breaks, as is the case for the restraining strap 62 associated with the output member or push-rod 42 of the slave cylinder 18.

The connection of the master cylinder 12 to the slave cylinder 18 via the flexible conduits 14 and 16 may be effected through the intermediary of leak-proof connectors, as disclosed in detail in co-pending application Ser. No. 555,667, such that the master cylinder 12 and the slave cylinder 18 may be disconnected from each other after filling with hydraulic fluid and reconnected after installation on a motor vehicle.

Figure 3:
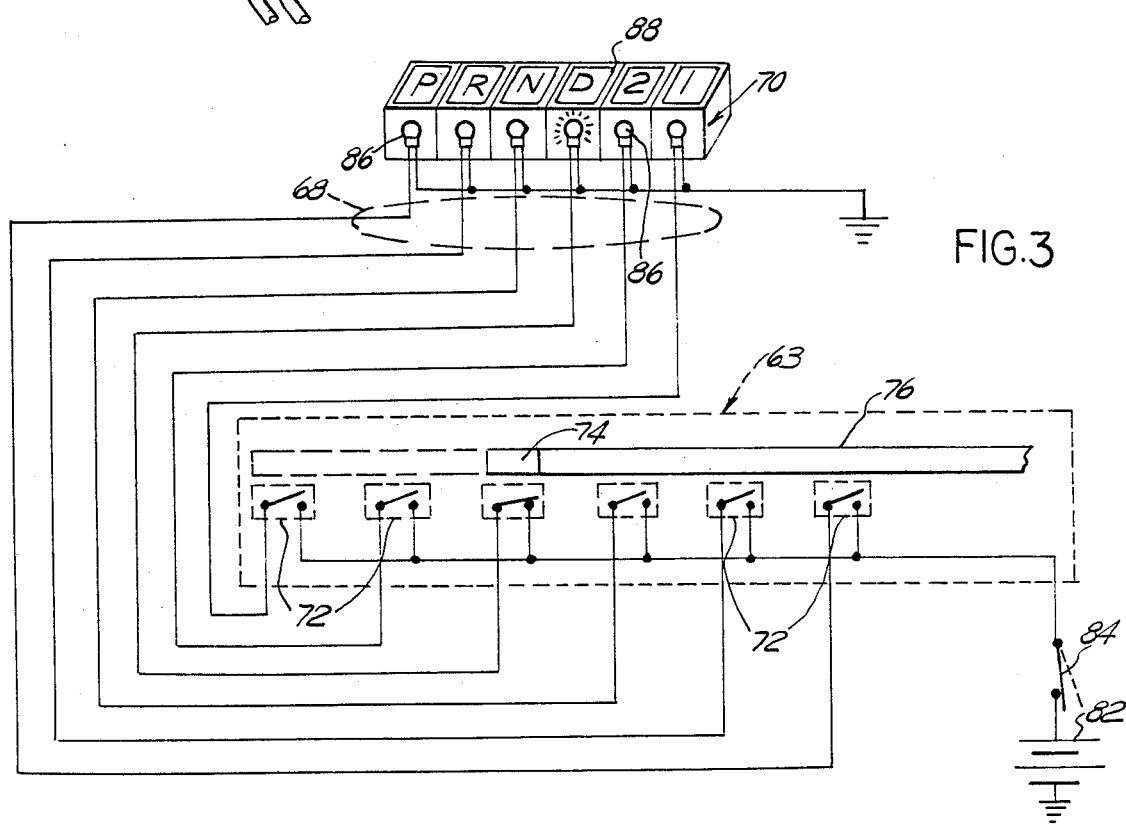
FIG. 3 is an electrical circuit schematic of the indicator portion of FIGS. 1 and 2.

An operative mode indicator transmitter 63 disposed in a housing 64 attached to or formed integral with the housing 20 of the master cylinder 12 is electrically connected by way of an electrical connector 66 and a harness 68 to an operative mode light indicator or annunciator 70, installed in an appropriate location, for example on the instrument panel, in full view of the motor vehicle driver. As best shown at FIG. 2 and in the circuit diagram of FIG. 3, the transmission operative mode sender or transmitter 62 takes the form of a plurality of magnetic reed switches 72 mounted at regular intervals within the housing 64, and separately actuatable by proximity with a permanent magnet 74 mounted on the end of a rod 76 coupled to the master cylinder input rod 26 and being linearly displaceable in unison therewith, as a result of being provided with a bent-over portion 78 having a clamp 80 on its end for attachment at an appropriate location to the master cylinder input member or push-rod 26. The reed switches 72 have one of their terminals connected through a common line to a terminal, such as the positive terminal, of the electrical DC power source of the motor vehicle through a switch 84, which may be the ignition switch or a relay switch closed when the ignition switch is turned on. Each of the other terminals of the reed switches 72 is connected to an individual wire in the harness 68 to a terminal of one of a plurality of light bulbs 86 mounted in the instrument panel indicator or annunciator 70 behind a window 88. The annunciator window 88 is separated in sections, each indicating a particular mode of operation of the transmission, such as P for "park", R for "reverse", N for "neutral", D for "drive" (normal), 2 for second gear and 1 for first or lower gear. Each light bulb 86 is mounted behind the window 88 such that the light emitted by the light bulb illuminates only the appropriate section of the annunciator window 88 corresponding to that light bulb. The other terminal of a light bulb 86 is returned to ground when a circuit through an appropriate reed switch 72 is closed, while all the other reed switches 72 are open, when the permanent magnet 74 mounted on the end of the rod 76 is proximately located to that reed switch 72. It can thus be seen that when the input member or push-rod 26 of the master cylinder 12 is displaced by the floor mounted shift or mode selection lever 32 or the steering column mounted shift or mode selection lever 52, the operative mode transmitter 63 provides at the instrument panel annunciator 70 the illumination of a corresponding one of the light bulbs 86, whose circuit is closed through the appropriate reed switch 72, with the result that the annunciator window 88 displays a lit portion corresponding to the appropriate transmission operative mode selected by the driver.

Having thus described the present invention by way of an example of structure well designed to accomplish the objects of the invention, modifications whereof will be apparent to those skilled in the art, what is claimed as new is as follows:

I claim:

1. A hydraulic apparatus for remotely operating a motor vehicle automatic transmission mode selection arm, said apparatus comprising a master cylinder in the form of a tubular housing, a piston reciprocable in said housing and separating said housing into a first chamber on one side of said piston and a second chamber on the other side of said piston, an input rod connected to an end to said piston and connectable at its other end to an end of an arm attached to an operative mode shift lever whereby angular displacement of said shift lever causes linear displacement of said input rod, a remotely located slave cylinder having a housing identical to the housing of said master cylinder internally provided with a reciprocable piston forming a first chamber on one side thereof and a second chamber on the other side thereof, a first flexible conduit placing said first chamber of said master cylinder in fluid communication with one of said chambers of said slave cylinder, a second flexible conduit placing said second chamber of said master cylinder in fluid communication with the other of said chambers of said slave cylinder, an output member linearly displaceable by said piston in said slave cylinder, means at the end of said output member for connecting said output member to said automatic transmission mode selection arm projecting from said transmission, and hydraulic fluid filling said master cylinder first and second chambers, said slave cylinder first and second chambers and said first and second flexible conduits, whereby linear displacement of said master cylinder input member as controlled by said operative mode shift lever causes a corresponding analog linear displacement of said slave cylinder output member and operates said transmission mode selection arm, said apparatus further comprising a first break-away restraining strap holding said master cylinder input member against extension beyond a finite position prior to installation on a motor vehicle and a second break-away restraining strap holding said slave cylinder output member against extension beyond a finite position, wherein said apparatus is filled with hydraulic fluid after complete assembly of said apparatus and prior to installation in a motor vehicle, whereby said first restraining strap is broken during first extension of said master cylinder input member beyond said finite position and said second restraining strap is broken during first extension of said slave cylinder output member beyond said finite position after installation on a motor vehicle, said master cylinder input rod being displaceable to one of a plurality of selectable transmission operative modes corresponding to "park", "reverse", "neutral", "drive" and at least two additional gear ratio modes, said apparatus further comprising a selected mode visual display, a selected mode transmitter electrically connected to said visual display, said selected mode transmitter comprising a plurality of individually operable switches each closing a circuit through a light indicator mounted behind an annunciator window forming part of said visual display, each of said light indicators being arranged to illuminate an area of said annunciator window provided with a selected mode marking, and means coupled to said master cylinder input member for selectively closing one of said individually operable switches for activating a corresponding light indicator, each of said switches comprising a reed switch, all of said reed switches being disposed end to end in a plane parallel to the longitudinal axis of said master cylinder, and said means for actuating said reed switches comprising a permanent magnet mounted on the end of a rod coupled to said master cylinder input member for displacement thereby for locating said magnet proximate an appropriate reed switch corresponding to a selected operative mode of said transmission.

2. An apparatus for remotely operating a motor vehicle automatic transmission mode selection arm, said apparatus comprising a master cylinder in the form of a tubular housing, a piston reciprocable in said housing and separating said housing into a first chamber on one side of said piston and a second chamber on the other side of said piston, an input rod connected at an end to said piston and connected at its other end to an end of an arm attached to an operative mode shift lever whereby angular displacement of said shift lever causes linear displacement of said input rod to one of a plurality of selectable transmission operative modes corresponding to "park", "reverse", "neutral", "drive" and at least two additional gear ratio modes, a remotely located slave cylinder having a housing identical to the housing of said master cylinder internally provided with a reciprocable piston forming a first chamber on one side thereof and a second chamber on the other side thereof, a first flexible conduit placing said first chamber of said master cylinder in fluid communication with one of said chambers of said slave cylinder, a second flexible conduit placing said second chamber of said master cylinder in fluid communication with the other of said chambers of said slave cylinder, an output member linearly displaceable by said piston in said slave cylinder, means at the end of said output member connecting said output member to said transmission mode selection arm projecting from said transmission, and hydraulic fluid filling said master cylinder first and second chambers, said slave cylinder first and second chambers and said first and second flexible conduits, whereby linear displacement of said master cylinder input member as controlled by said operative mode selection lever causes a corresponding analog linear displacement of said slave cylinder output member and operates said transmission mode selection arm, a selected mode visual display, a selected mode transmitter electrically connected to said visual display, said selected mode transmitter comprising a plurality of individually operable switches each closing a circuit through a light indicator mounted behind an annunciator window forming part of said visual display, each of said light indicator being arranged to illuminate an area of said annunciator window provided with a selected mode marking, and means coupled to said master cylinder input member for selectively closing one of said individually operable switches for activating a corresponding light indicator, each of said switches comprising a reed switch, all of said reed switches being disposed end to end plane parallel to the longitudinal axis of said master cylinder, and said means for actuating said reed switches comprising a permanent magnet mounted on the end of a rod coupled to said master cylinder input member for displacement thereby for locating said magnet proximate an appropriate reed switch corresponding to a selected operative mode of said transmission.

* * * * *